(12) United States Patent
Yang

(10) Patent No.: US 6,257,596 B1
(45) Date of Patent: Jul. 10, 2001

(54) SELF LOCKING DEVICE FOR POWER TOOL

(76) Inventor: Wen Yung Yang, No. 206-12, Sec. 1, Kuo Kuang Road, Da Li City, Taichung Hsien (TW), 412

(*) Notice: Subject to any disclaimer, the term of this patent is extended or adjusted under 35 U.S.C. 154(b) by 0 days.

(21) Appl. No.: 09/376,403

(22) Filed: Aug. 18, 1999

(51) Int. Cl.⁷ .................................................. B23B 31/12
(52) U.S. Cl. .............................. 279/62; 279/140; 279/902
(58) Field of Search .............................. 279/60–62, 140, 279/150, 902

(56) References Cited

U.S. PATENT DOCUMENTS

| 4,951,955 | * | 8/1990 | Sakamaki | ................................. | 279/62 |
| 5,988,653 | * | 11/1999 | Kuo | ........................................ | 279/62 |
| 5,992,859 | * | 11/1999 | Lin | ......................................... | 279/62 |

* cited by examiner

*Primary Examiner*—Steven C. Bishop
(74) *Attorney, Agent, or Firm*—Charles E. Baxley

(57) ABSTRACT

A self locking device for a power tool includes a rod to be driven by the power tool, and three or more pawls slidably engaged in the rod for securing a tool member to the rod. A barrel includes an inner thread threaded with the threaded surfaces of the pawls. A follower is slid ably secured to the barrel and rotated in concert with the barrel and includes one or more teeth for engaging with the teeth of a striker and for allowing the striker to act onto the follower in a hammer striking way and to facilitate the action onto the tool member.

4 Claims, 8 Drawing Sheets

SELF LOCKING DEVICE FOR POWER TOOL

BACKGROUND OF THE INVENTION

1. Field of the Invention

The present invention relates to a locking device, and more particularly to a self locking device for a power tool.

2. Description of the Prior Art

Typical power tools comprise a chuck for securing the tool members, such as the screw driver bits, the drill gimlets, or the wrench tools. The power tools include a control ferrule that is required to be rotated to secure the tool members to the power tool manually. In addition, an additional locking tool is required to further solidly secure the tool members to the power tool.

The present invention has arisen to mitigate and/or obviate the afore-described disadvantages of the conventional locking devices for power tools.

SUMMARY OF THE INVENTION

The primary objective of the present invention is to provide a power tool having a self locking device for locking the tool member to the power tool.

In accordance with one aspect of the invention, there is provided a self locking device for a power tool comprising a rod for securing to and for being driven by the power tool, the rod including three or more channels for slidably receiving three or more pawls to engage with a tool member, the pawls each including a threaded surface, a barrel including an inner thread threaded with the threaded surfaces of the pawls, a follower slidably secured to the barrel and rotated in concert with the barrel, the follower including one or more teeth, a striker including one or more teeth for engaging with the teeth of the follower, and means for biasing the teeth of the striker to engage with the teeth of the follower.

A housing includes one or more channels for slidably receiving one or more keys of the striker and for slidably securing the striker to the housing and for allowing the striker to be rotated in concert with the housing. The housing includes a cap, the biasing means includes a spring engaged between the cap and the striker for biasing the teeth of the striker to engage with the teeth of the follower.

A casing is further secured to the rod, the housing includes an aperture formed therein, the casing includes an engaging hole formed therein for engaging with a driving tool and for allowing the casing to be rotated relative to the housing. A spacer is further disposed between the casing and the barrel.

The rod includes three or more channels formed therein and includes a peripheral swelling extended radially outward therefrom and having three or more inclined orifices formed therein and aligned with the channels of the rod for slidably receiving the pawls.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
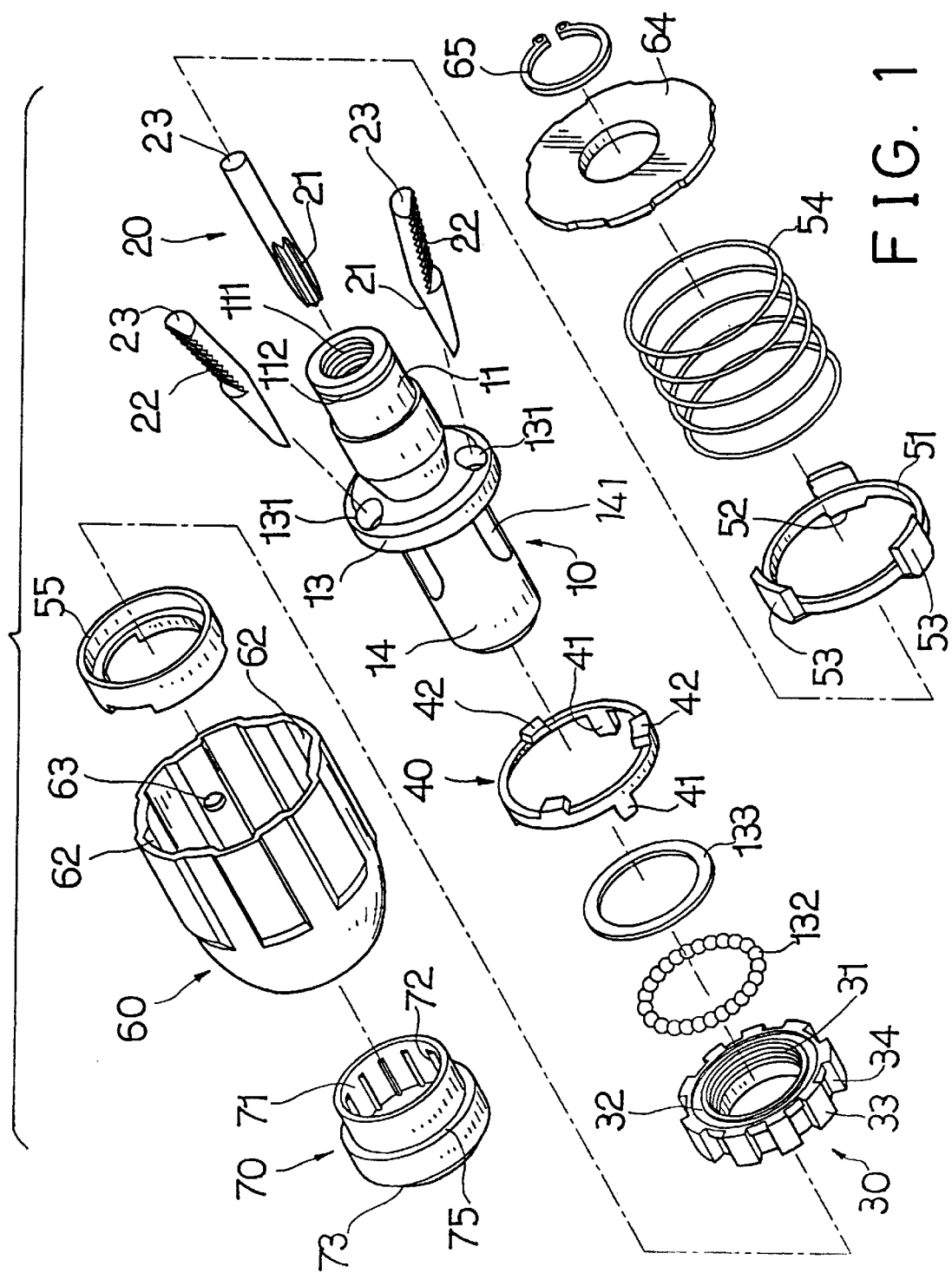
FIG. 1 is an exploded view of a self locking device for a power tool in accordance with the present invention.
Figure 2:
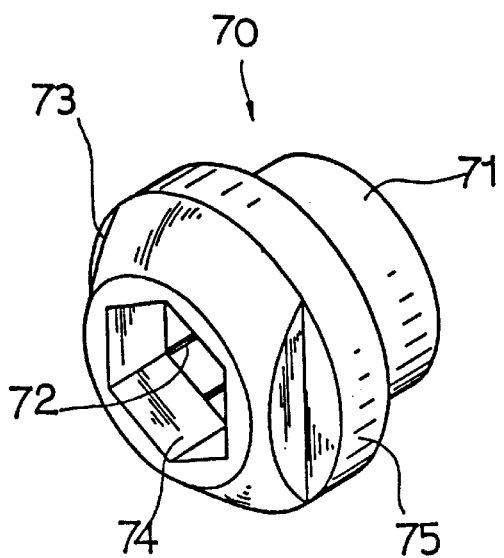
FIG. 2 is a perspective view of a casing.
Figure 3:
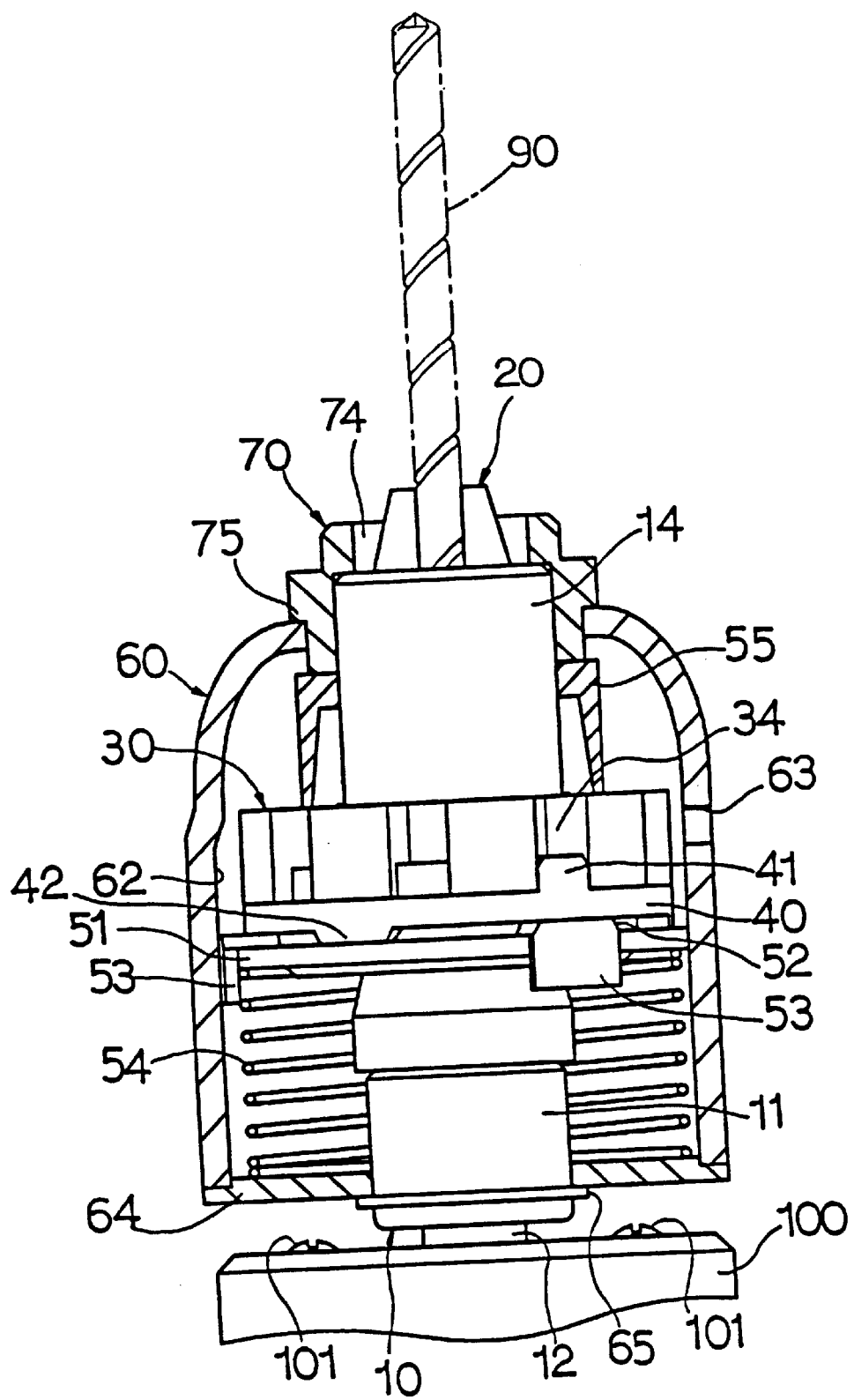
FIG. 3 is a cross sectional view taken along lines 3—3 of FIG. 5.
Figure 4:
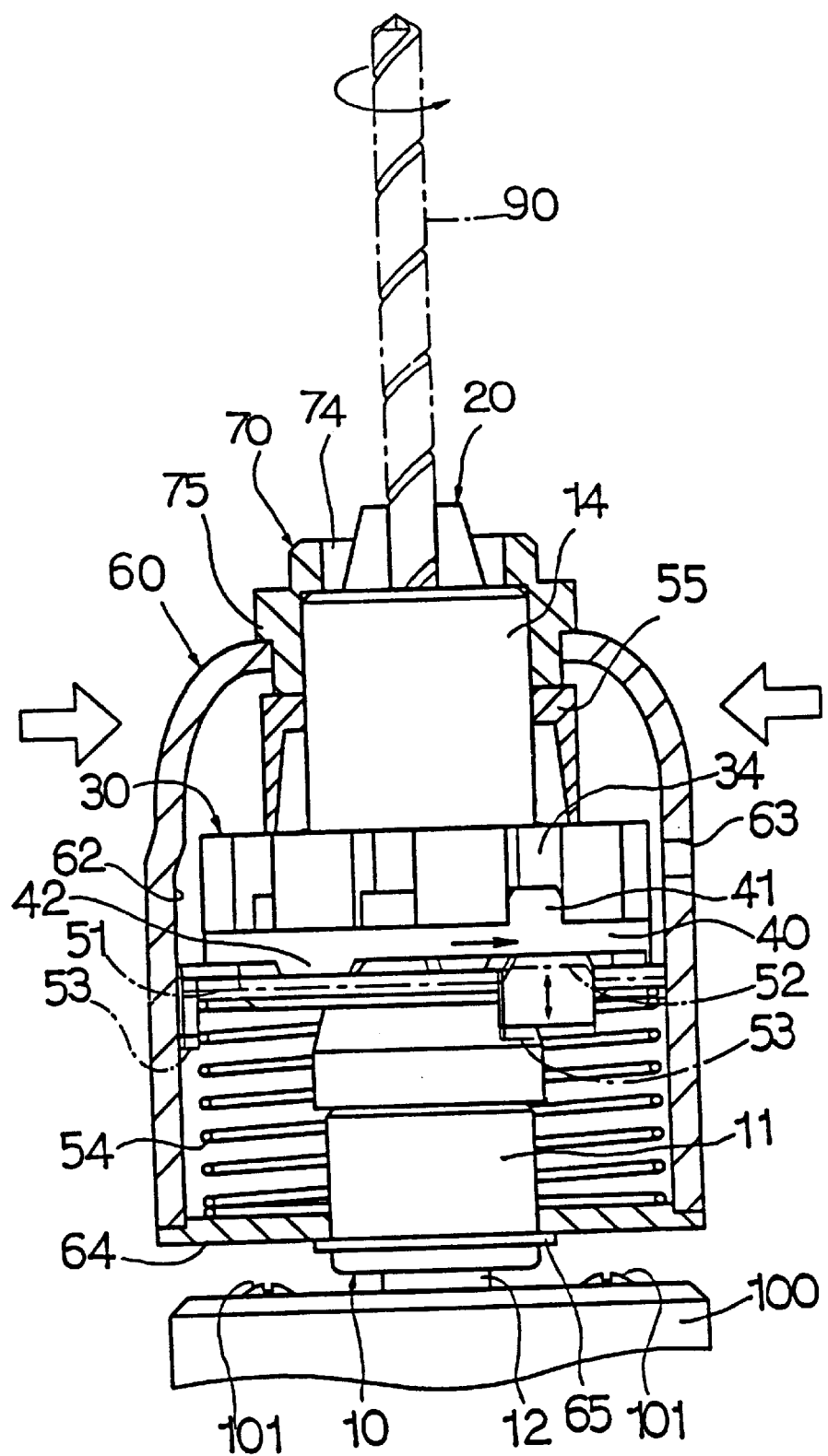
FIG. 4 is a cross sectional view similar to FIG. 3, illustrating the operation of the self locking device.
Figure 6:
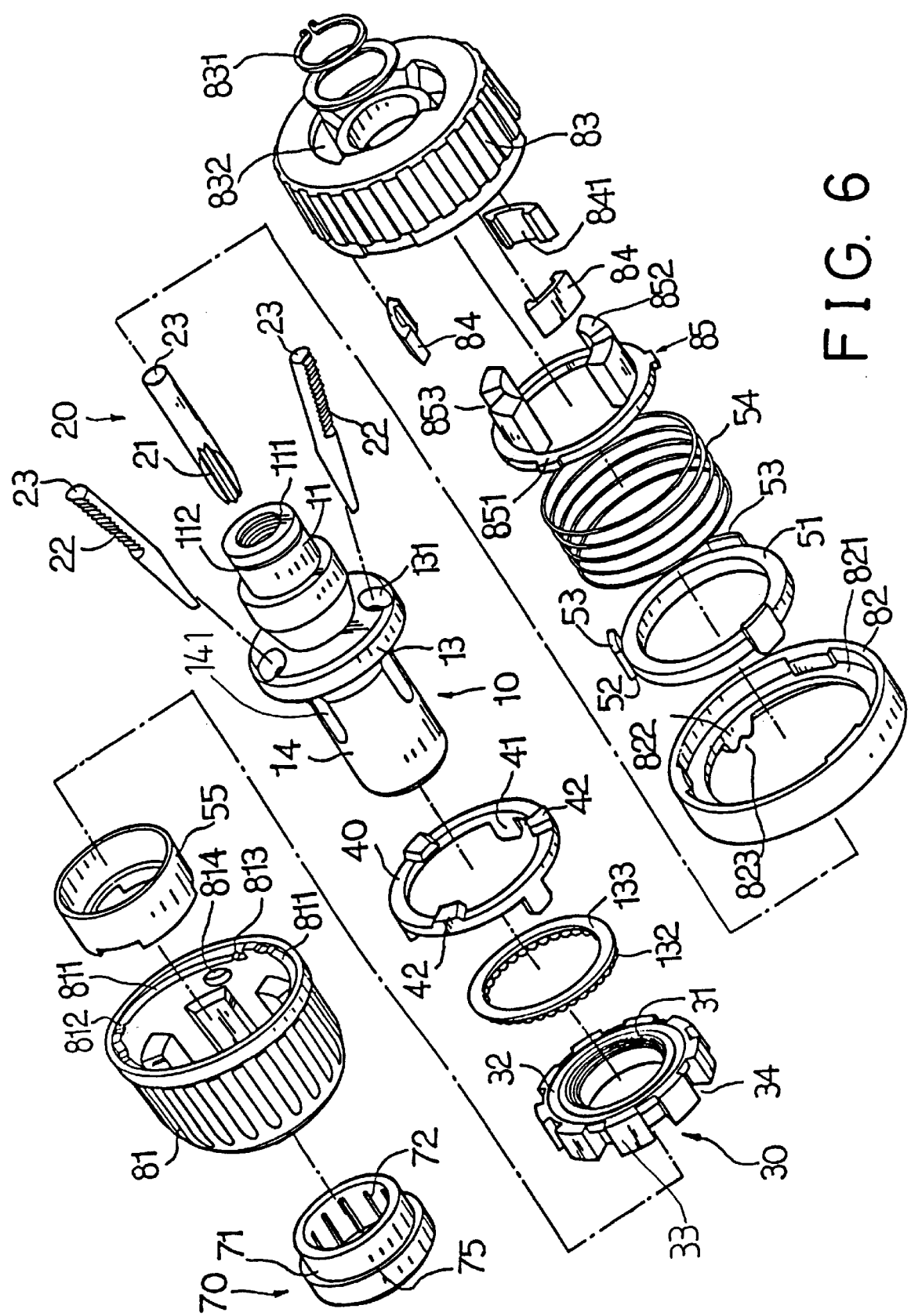
FIG. 6 is an exploded view illustrating the other application of the self locking device.

Referring to the drawings, and initially to FIGS. 1–3, a self locking device in accordance with the present invention comprises a rod 10 including an inner thread 111 formed in one end 11 for securing to a spindle 12 of a power tool 100 and for being driven by the power tool 100. The power tool 100 includes one or more fasteners 101 secured thereon. The rod 10 includes the other end 14 having three or more channels 141 formed therein and includes a peripheral swelling 13 extended radially outward therefrom and having three or more inclined orifices 131 formed therein and aligned with the channels 141 of the rod 10 for slidably receiving three or more pawls 20 (FIG. 8). The pawls 20 each includes an engaging surface 21 formed in one end thereof for engaging with the tool member 90 and each includes a threaded surface 22 formed in the other end 23 thereof for threading with an inner thread 31 of a barrel 30 which includes a number of juts 33 extended radially outward therefrom for defining a number of depressions 34 therebetween. The rotation of the barrel 30 relative to the rod 10 and the pawls 20 in one direction may force the pawls 20 inward of the other end 14 of the rod 10 to secure the tool member 90 (FIGS. 3, 4, 7–9) in place, and may disengage the pawls 20 from the tool member 90 to release the tool member 90 when the barrel 30 is rotated in the other direction relative to the pawls 20. A ball bearing 132 and a washer 133 are disposed between the barrel 30 and the peripheral swelling 13 of the rod 10.

A housing 60 is engaged on the rod 10 and the barrel 30 and includes one or more channels 62 and an aperture 63 formed therein. A cap 64 is secured to one end of the housing 60 and rotatably secured to the rod 10 by a clamping ring 65. A follower 40 includes one or more projections 41 slidably engaged in the depressions 34 of the barrel 30 for allowing the follower 40 to be slided relative to the barrel 30 and to be rotated in concert with the barrel 30. The follower 40 includes one or more teeth 42 extended therefrom. A striker 51 includes one or more keys 53 formed thereon and slidably received in the channels 62 of the housing 60 for allowing the striker 51 to be slided relative to the housing 60 and to be rotated in concert with the housing 60. The striker 51 includes one or more teeth 52 extended therefrom for engaging with the teeth 42 of the follower 40 and for allowing the striker 51 to act on or strike onto the follower 40 when the striker 51 and the housing 60 are rotated relative to the follower 40. A spring 54 is engaged between the cap 64 of the housing 60 and the striker 51 for biasing the striker 51 to act onto the follower 40.

In operation, when the rod 10 and thus the pawls 20 are driven by the power tool 100 in a fast speed, the pawls 20 may be rotated relative to the barrel 30 due to the moment of inertia such that the pawls 20 may be forced to engage with and to drive the tool member 90 to drive the fasteners. When the pawls 20 are threaded and secured to the barrel 30, the barrel 30 and thus the follower 40 and the striker 51 and the housing 60 may be rotated by the rod 10. When the housing 60 is grasped by the user (FIG. 4), the striker 51 may be forced away from the follower 40 against the spring 54 and may be forced to strike onto the follower 40 due to the engagement between the teeth 42, 52 of the follower 40 and the striker 51. The tool member 90 may thus be forcedly driven by the power tool.

A casing 70 includes a bore 71 formed therein for receiving the other end 14 of the rod 10 and includes one or more ribs 72 extended inward of the bore 71 of the casing 70 for force-fitting the casing 70 onto the rod 10 and for securing the casing 70 to the rod 10. A spacer 55 is secured between the casing 70 and the barrel 30. The casing 70 includes an annular swelling 75 extended therefrom and includes one or more flat surfaces 73 and/or an engaging hole 74 formed therein for engaging with a driving tool 92 (FIG. 5) which may be used to rotate the casing 70 and the rod 10 relative to the barrel 30 when another tool 91 is engaged with either of the depressions 34 of the barrel 30 through the aperture 63 of the housing 60. The rod 10 and thus the pawls 20 may be rotated relative to the barrel 30 and the housing 60 in order to disengage the tool member 90 from the rod 10.

Figure 5:
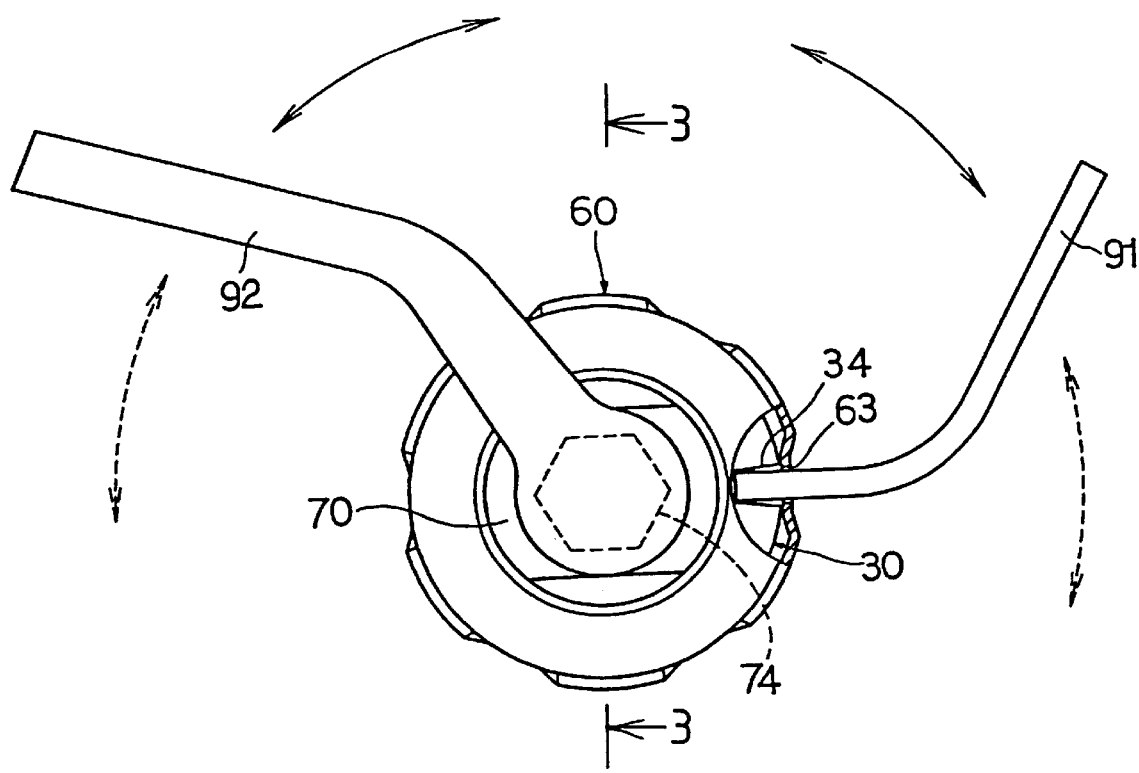
FIG. 5 is an end view, illustrating the operation of the self locking device.
Figure 7:
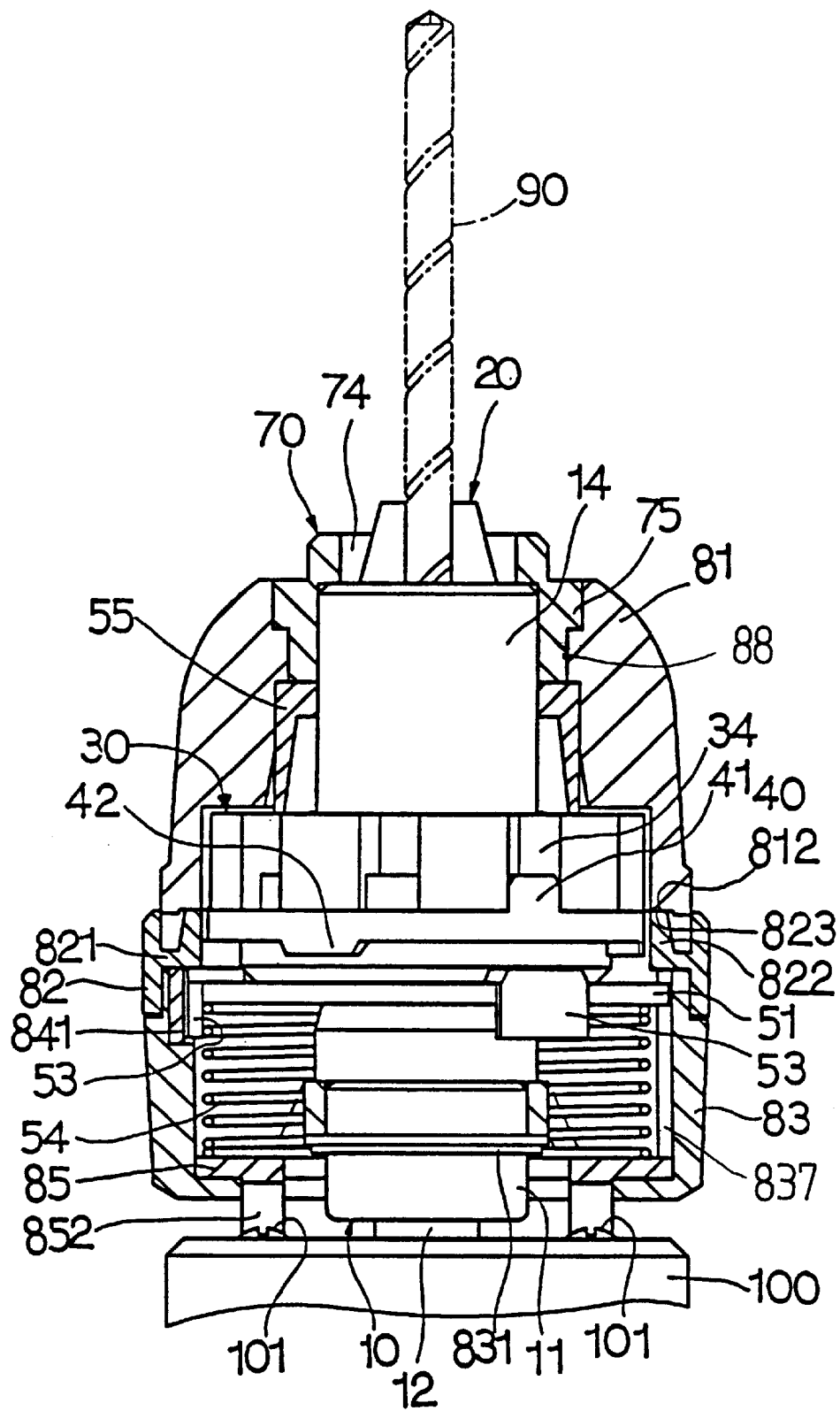
FIG. 7 is a cross sectional view of the self locking device as shown in FIG. 6.
Figure 8:
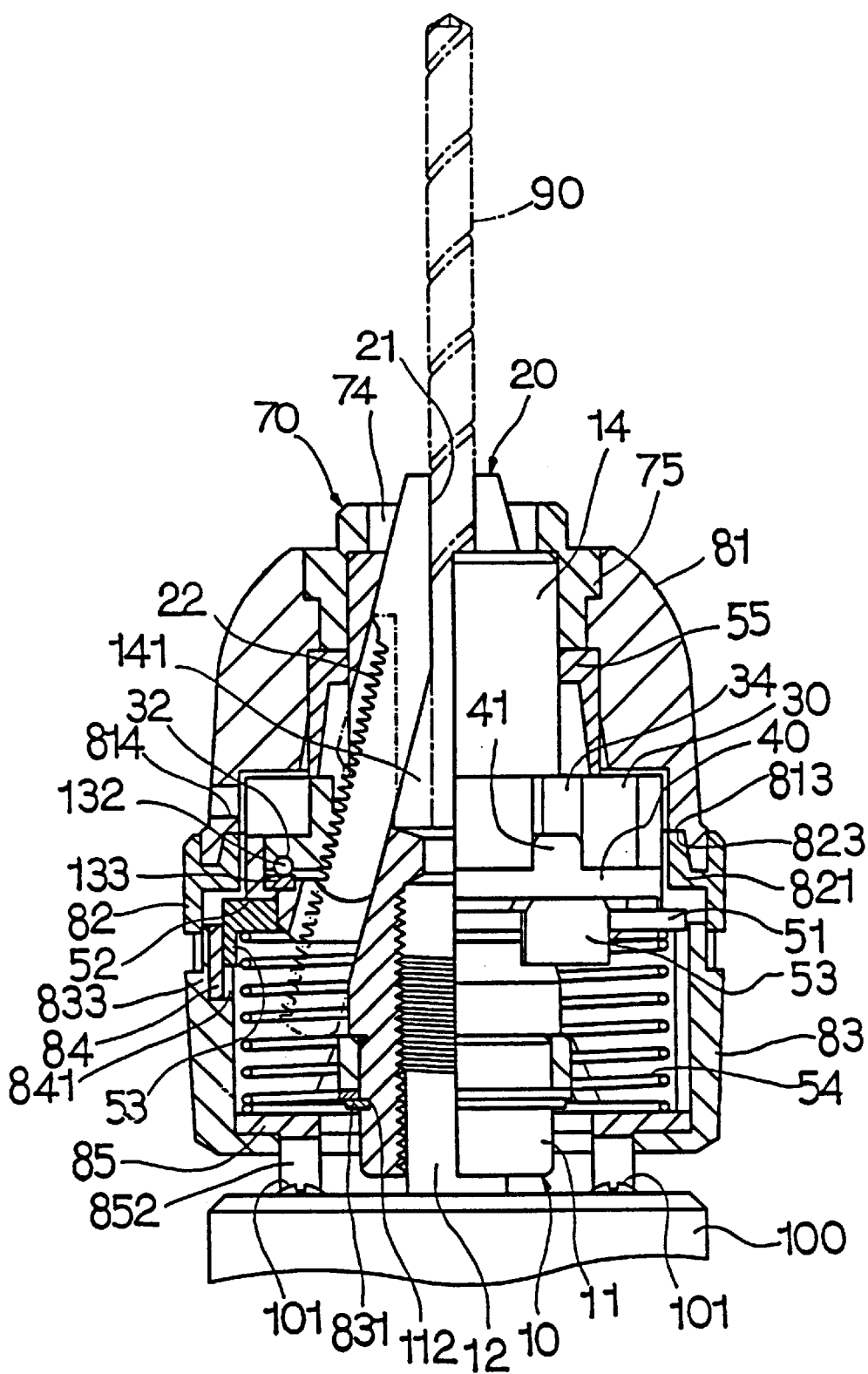
FIGS. 8 and 9 are cross sectional views illustrating the operation of the self locking device.
Figure 9:
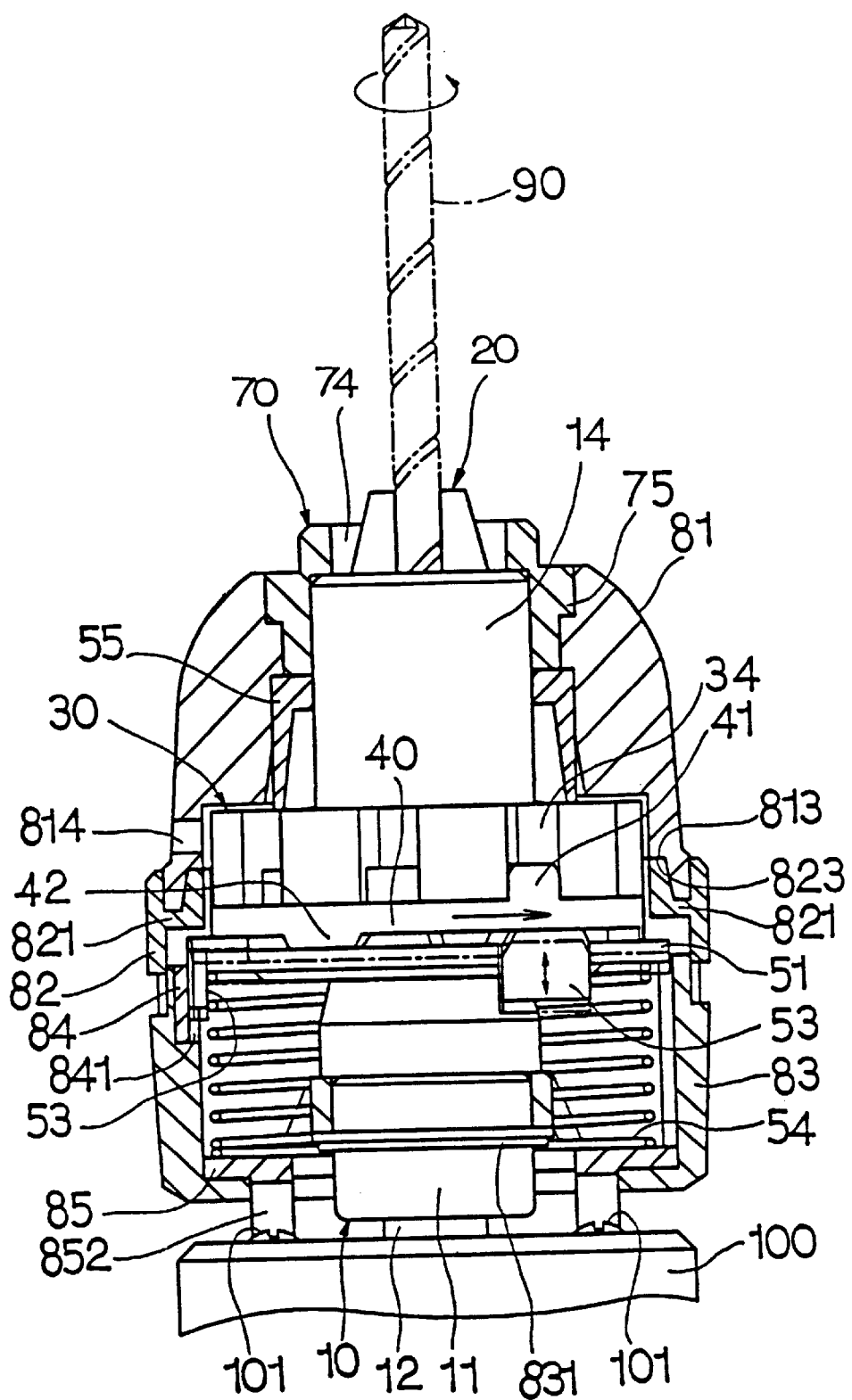

Referring next to FIGS. 6–9, instead of the housing 60 as that shown in FIGS. 1–5, a ferrule 81 and a ring 82 and a cover 83 are provided, in which the ring 82 is rotatably disposed between the cover 83 and the ferrule 81. The ferrule 81 includes an annular flange 88 extended radially inward therefrom and rotatably engaged with the annular swelling 75 of the casing 70 for rotatably securing the ferrule 81 to the casing 70. The ferrule 81 includes one or more tapered surface 811 formed therein and two projections 812, 813 formed in the ends of the tapered surface 811, and includes a hole 814 for engaging with the tool 91 (FIG. 5). The ring 82 includes an annular flange 821 extended radially inward therefrom for engaging with the striker 51 and includes one or more protrusions 822 each having a recess 823 formed therein for receiving the projections 812, 813 of the ferrule 81 and for determining the spacing distance between the ferrule 81 and the ring 82. The cover 83 is rotatably secured to the rod 10 by a clamping ring 831 and includes one or more passages 832 formed therein for slidably receiving a block 84 each. The blocks 84 each includes a notch 841 formed therein for slidably receiving the keys 53 of the striker 51. A ring 85 includes one or more stops 851 for slidably engaging with the grooves 837 (FIG. 7) of the cover 83 and for allowing the ring 85 to be rotated in concert with the cover 83 and to be slided relative to the cover 83. The ring 85 includes one or more pairs of extensions 852 extended therefrom for defining one or more cavities 853 and for receiving the fasteners 101 of the power tool 100 (FIGS. 7–9). The spring 54 may bias the extensions 852 of the ring 85 to engage with the power tool 100 and may position the cover 83 to the power tool 100.

In operation, as shown in FIG. 7, the striker 51 may be disengaged from the follower 40 by rotating the ferrule 81 relative to the ring 82 in one direction such that the striker 51 may not be acted onto the follower 40. When the ring 82 and thus the striker 51 are moved toward the ferrule 81 when the ferrule 81 is rotated relative to the ring 81 in the reverse direction, the striker 51 may be biased to act on the follower 40 in a continuously striking way as that disclosed for FIGS. 1–5.

Accordingly, the power tool in accordance with the present invention includes a self locking device for locking the tool member to the power tool.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A self locking device for a power tool, said self locking device comprising:

a rod for securing to and for being driven by the power tool, said rod including at least three channels formed therein, a casing secured to said rod, said casing including an engaging hole formed therein, at least three pawls slidably engaged in said at least three channels of said rod for engaging with a tool member, said at least three pawls each including a threaded surface formed therein, a barrel including an inner thread formed therein and threaded with said threaded surfaces of said at least three pawls, a follower slidably secured to said barrel and rotated in concert with said barrel, said follower including at least one tooth extended therefrom, a housing including at least one channel formed therein, said housing including an aperture formed therein, said engaging hole of said casing being provided for engaging with a driving tool and for allowing said casing to be rotated relative to said housing, a striker including at least one tooth extended therefrom for engaging with said at least one tooth of said follower, said striker including at least one key slidably received in said at least one channel of said housing for slidably securing said striker to said housing and for allowing said striker to be rotated in concert with said housing, and means for biasing said at least one tooth of said striker to engage with said at least one tooth of said follower.

2. The self locking device according to claim 1, wherein said housing includes a cap secured thereto, said biasing means includes a spring engaged between said cap and said striker for biasing said at least one tooth of said striker to engage with said at least one tooth of said follower.

3. The self locking device according to claim 1 further comprising a spacer disposed between said casing and said barrel.

4. The self locking device according to claim 1, wherein said rod includes at least three channels formed therein and includes a peripheral swelling extended radially outward therefrom and having at least three inclined orifices formed therein and aligned with said at least three channels of said rod for slidably receiving said at least three pawls.

* * * * *